US008038231B1

(12) United States Patent
O'Canna

(10) Patent No.: US 8,038,231 B1
(45) Date of Patent: Oct. 18, 2011

(54) CONTROL VALVE

(75) Inventor: Theodore P. O'Canna, Versailles, KY (US)

(73) Assignee: Lexair, Inc., Lexington, KY (US)

( * ) Notice: Subject to any disclaimer, the term of this patent is extended or adjusted under 35 U.S.C. 154(b) by 1269 days.

(21) Appl. No.: 11/711,377

(22) Filed: Feb. 27, 2007

(51) Int. Cl.
*B60T 8/36* (2006.01)

(52) U.S. Cl. ................. 303/119.2; 137/556; 137/596.18

(58) Field of Classification Search ............. 137/596.16, 137/596.18, 625.25, 625.6, 625.67, 556; 105/286, 311.1; 303/119.1-119.3
See application file for complete search history.

(56) References Cited

U.S. PATENT DOCUMENTS

| | | | | |
|---|---|---|---|---|
| 1,711,211 | A | 4/1929 | Schmohl et al. | |
| 4,072,126 | A | 2/1978 | Kemp | |
| 4,726,393 | A * | 2/1988 | Herner | 137/269 |
| 4,729,408 | A | 3/1988 | Coutant | |
| 5,072,748 | A | 12/1991 | Gripe et al. | |
| 6,766,828 | B2 * | 7/2004 | Takada et al. | 137/625.6 |
| 6,789,856 | B2 | 9/2004 | Bottiglieri | |
| 7,093,544 | B1 | 8/2006 | Allen et al. | |
| 7,328,661 | B1 * | 2/2008 | Allen et al. | 105/286 |
| 2005/0199292 | A1 | 9/2005 | Stedman et al. | |

* cited by examiner

*Primary Examiner* — Christopher Schwartz
(74) *Attorney, Agent, or Firm* — Stites & Harbison, PLLC; David W. Nagle, Jr.

(57) ABSTRACT

Pivotally mounted doors forming the floor of a railroad car are prevented from opening inadvertently through not allowing fluid pressure to be applied to a door opening piston until the fluid pressure exceeds a predetermined amount. A control valve can control the position of a spool.

12 Claims, 18 Drawing Sheets

CONTROL VALVE

This invention relates to a control valve for providing a positive locking valve with a hydraulic or pneumatic system to prevent the inadvertent movement of a piston or spool in a hydraulic or pneumatic valve in the hydraulic or pneumatic system. The control valve also includes an indicator to indicate to a user whether it is safe to apply fluid pressure to a hydraulic or pneumatic system with which the control valve is used.

One specific utilization of the control valve is in a hydraulic or pneumatic system employed for controlling simultaneous opening and simultaneous closing of a plurality of doors forming a floor of a railroad car and, more particularly, to a control valve in which a predetermined air pressure must be available before opening of the doors can occur. However, it may be utilized with any hydraulic or pneumatic system in which specific control of positions of a piston, for example, are used.

This is an improvement of U.S. Pat. No. 7,093,544 to Allen et al, which is incorporated by reference herein. While the Allen et al patent functions satisfactorily to control the opening of the doors of the railroad cars with which it is used, this invention is capable of not only controlling the opening and closing of the doors, but it also enables a user to be able to ascertain the position of the piston controlling the opening and closing of the doors of the railroad cars by an indicator of the control valve.

Railroad cars are utilized to transport material such as coal, for example, for a relatively long distance from a mine to a power plant. When a train of the railroad cars reaches a predetermined position at the power plant, it is desired for the doors forming the floor of each railroad car to simultaneously open and allow the coal to fall by gravity into a coal unloading or receiving area as each of the railroad cars is disposed over the receiving area. It also is desired to simultaneously close the doors as soon as each of the railroad cars has advanced past the coal receiving area in which the coal is to be deposited from each of the railroad cars.

Air pressure is employed to move a piston of a control valve between two positions. The position of the piston controls supply of air pressure to act on a separate piston connected to the doors to move the doors between their open and closed positions. An air reservoir on each railroad car supplies the air pressure to the separate piston for opening and closing the doors on the railroad car.

The doors can be inadvertently opened, for example, when a movable element, which allows supply of air pressure to cause opening of the doors and is a solenoid plunger when a solenoid is used, is inadvertently energized. The movable element also can be inadvertently opened by a manually operated mechanism. This would occur when a person would accidentally or intentionally move the manually operated mechanism to enable air pressure to flow into a chamber in which a portion of the piston of the control valve is disposed to move the piston to allow air pressure to be supplied to a cylinder having the separate piston connected to the doors therein.

The movable element also could be inadvertently opened by a pick-up shoe on the railroad car accidentally engaging a rail having a desired DC voltage, which is used to open the doors when each railroad car of the train is at the coal unloading or receiving area.

In any of these situations, the doors of the railroad car can be opened prior to the railroad car being positioned over the coal unloading or receiving area into which the coal is to be deposited. This is because the air pressure in the air reservoir on each of the railroad cars of the train is built up from a compressor in the locomotive just prior to when the coal in the railroad cars brought from the mine is to be unloaded at the power plant. As a result, the air can flow past the inadvertently opened movable element as soon as sufficient pressure is supplied from the compressor to move the separate piston connected to the doors to its door opening position.

This problem is solved by the control valve of the present invention through utilizing a control element that prevents air pressure from being supplied to act on the piston in the housing of the control valve to shift the piston to cause air pressure to be exerted on the separate piston, which is connected to the doors, until each railroad car is at a first predetermined position at which coal will fall into the coal unloading or receiving area when the doors open as the railroad car is continuously advanced. Thus, it is necessary in the aforesaid Allen et al patent for the air pressure to exceed a predetermined amount before the piston of the control valve can be moved to allow the air pressure to be applied to the separate piston, which is connected to the doors. This can only occur when the doors in each railroad car are located over the coal unloading or receiving area since this is where a pick-up shoe on the railroad car engages a rail having the desired DC voltage and polarity.

This invention relates to a control valve that locks any movement of the piston for controlling at least one bottom dump air operated door for a railroad car movable between a closed position in which material within the railroad car is retained within the railroad car and an open position in which the material within the railroad car is released therefrom. The control valve of the present invention prevents any movement of the piston, irrespective of the pressure acting on it, by locking the piston-against movement until the control element of the control valve is activated by a first activator, which can be a solenoid, for example, that is activated when each railroad car is at a first predetermined position along a predetermined path, which is defined by the railroad tracks.

This results in movement of a plunger of the solenoid to open fluid pressure passages. This enables fluid pressure, which is presently air pressure, in a pneumatic system for controlling opening and closing of doors of railroad cars, to flow to act on the piston to move it in a first direction when the railroad car doors are to be opened. A second activator, which also can be a solenoid, for example, is activated at a second predetermined position along the predetermined path to return the control valve to its locking position in which the doors are closed. This is accomplished by movement of a plunger of the second solenoid opening fluid pressure passages to allow fluid pressure flow therethrough to move the piston in the second direction when the railroad car doors are to be closed.

This invention also relates to a control valve comprising a housing having a movable element therein movable between first and second positions along a linear axis in response to fluid pressure acting on at least one of opposite ends of the movable element. An interlock element is supported by the housing and is movable substantially perpendicular to the axis along which the movable element moves. One end of the movable element has an extension extending therefrom for a greater distance than the travel distance of the movable element in the direction in which the extension extends. The interlock element is movable between a first position to which it is biased by a biasing force and a second position to which it is moved when the biasing force on the interlock element is removed. The interlock element retains the movable element in its first position when the interlock element is in its first position to prevent movement of the movable element from its first position, and the interlock element ceases to prevent movement of the movable element when the interlock element is moved to its second position so that the movable element can be moved to its second position.

The attached drawings illustrate preferred embodiments of the present invention, in which.

Figure 1:
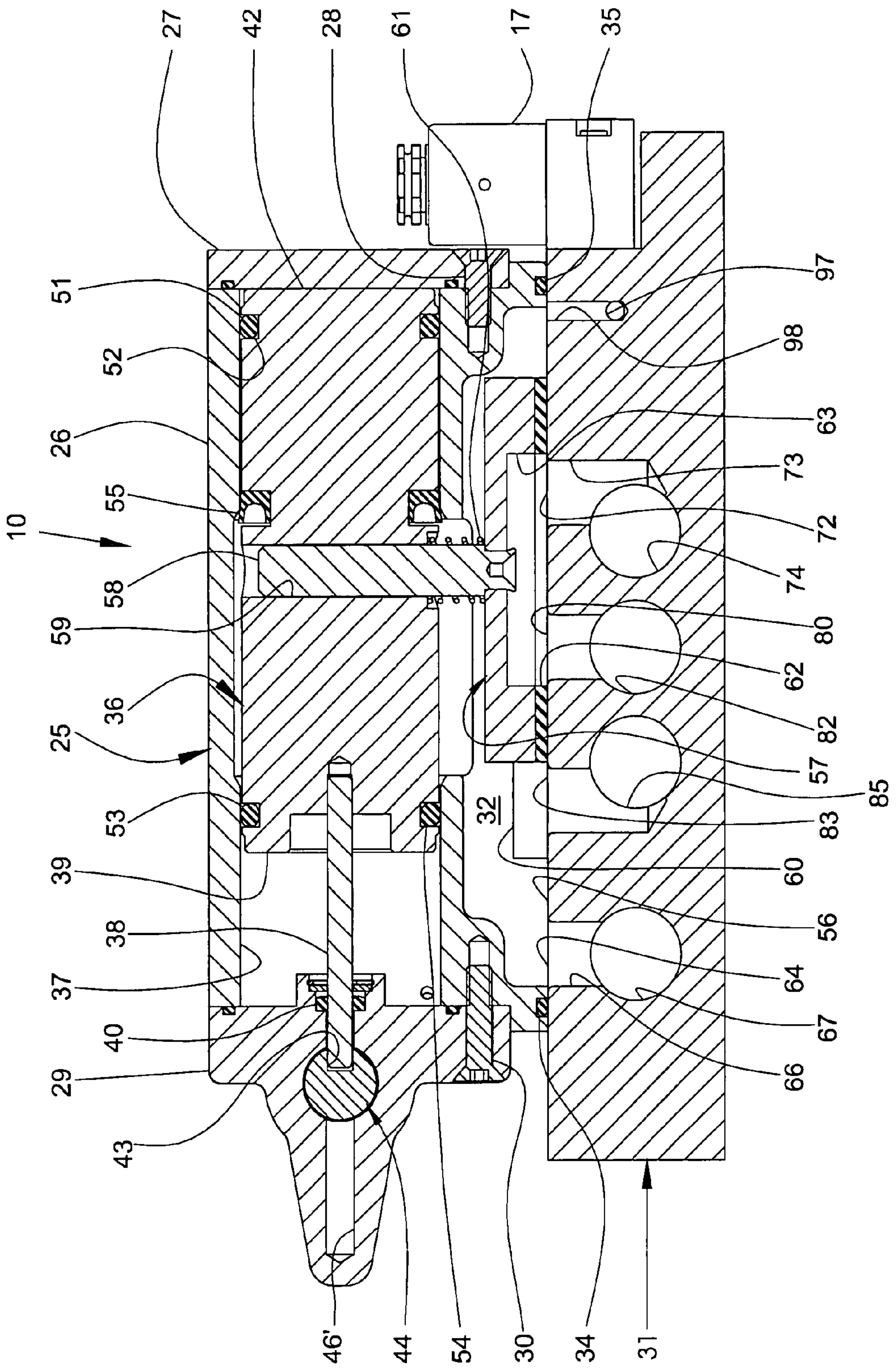
FIG. 1 is a sectional view, partly in elevation, of one embodiment of a control valve of the present invention used with a railroad car in its position in which doors forming a railroad car floor are closed and taken along line 1-1 of FIG. 6.
Figure 2:
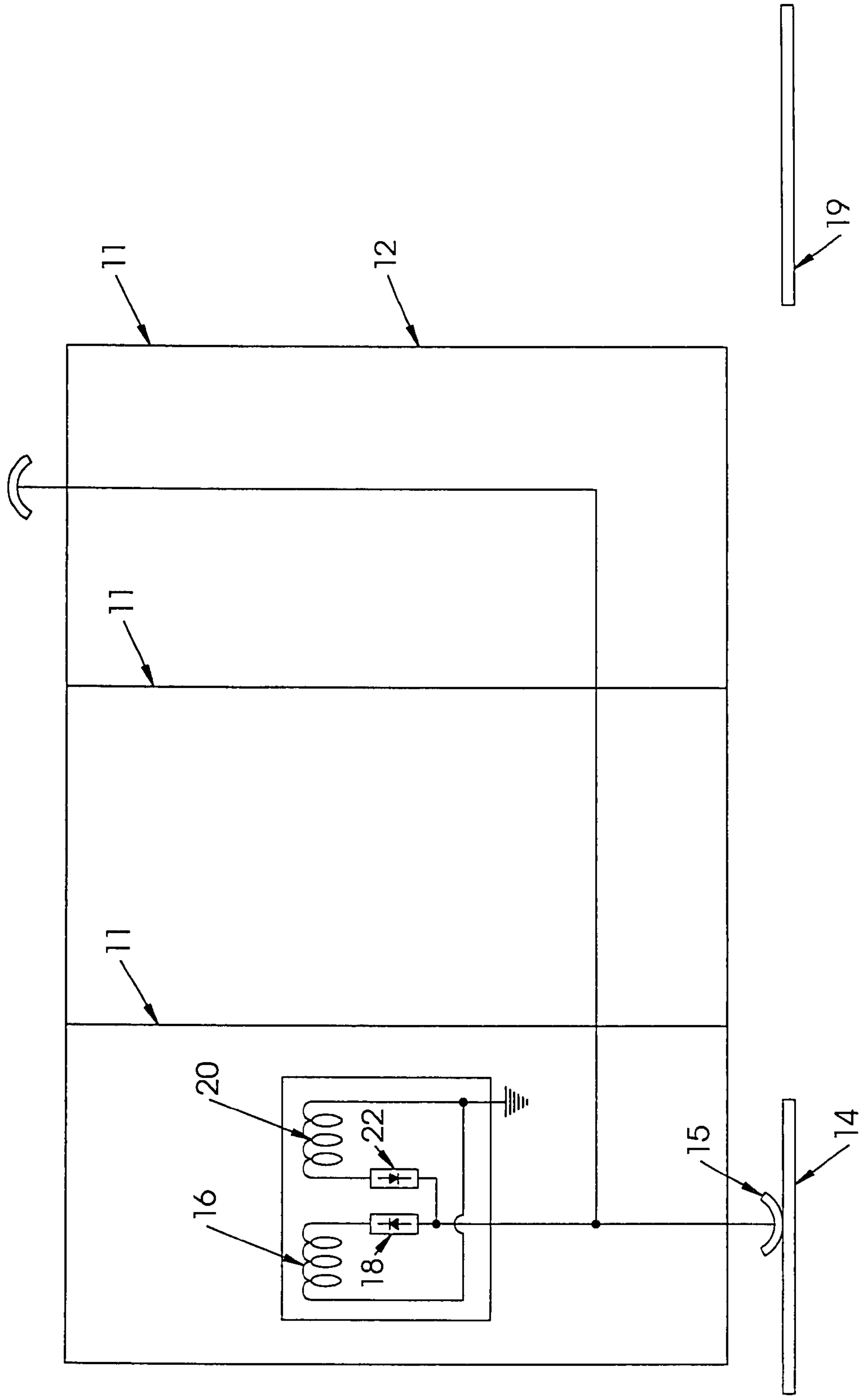
FIG. 2 is a schematic top plan view of a railroad car having the control valve of the present invention and showing the doors of the railroad car and the electrical control arrangement for causing opening and closing of the doors.

Referring to the drawings and particularly FIG. 1, there is shown a control valve 10 for controlling the opening and closing of a plurality of pivotally mounted doors 11 (see FIG. 2) forming the floor of a railroad car 12. Any material such as coal, for example, within the railroad car 12 can be dumped therefrom through simultaneously opening the doors 11 at a first predetermined position, which is where the coal is to be received in an unloading or receiving area at a power plant, for example.

The doors 11 are connected to each other in any suitable manner such as a beam, for example, so that all the doors 11 can be opened or closed simultaneously. Each of the doors 11 could have a pivotal portion and a fixed portion, if desired.

A first rail 14 having a positive voltage of 24 DC volts, for example, is engaged by a first pick-up shoe 15, which is supported by the railroad car 12, during movement of the railroad car 12. This energizes a coil 16 of a first solenoid 17 (see FIG. 1) through a first diode 18 (see FIG. 2) to cause the doors 11 to be simultaneously opened at the desired first predetermined position along a predetermined path, which is a railroad track.

As the railroad car 12 continuously advances, the pick-up shoe 15 engages a second rail 19 at a second predetermined position, which is a predetermined fixed distance from the first rail 14 in the direction of travel of the railroad car 12. The second rail 19 is charged negatively with the same voltage as the first rail 14 is charged positively. This results in a coil 20 of a second solenoid 21 (see FIG. 7), which is the same as the first solenoid 17, being energized through a second diode 22 (see FIG. 2) to cause the doors 11 to simultaneously close.

The control valve 10 (see FIG. 1) includes a housing 25 having a main portion or body 26 of a substantially cylindrical shape. An end cap 27 is attached to one end of the body 26 by screws 28 (one shown), and an end cap 29 is attached to the other end of the body 26 by screws 30 (one shown).

Figure 4:
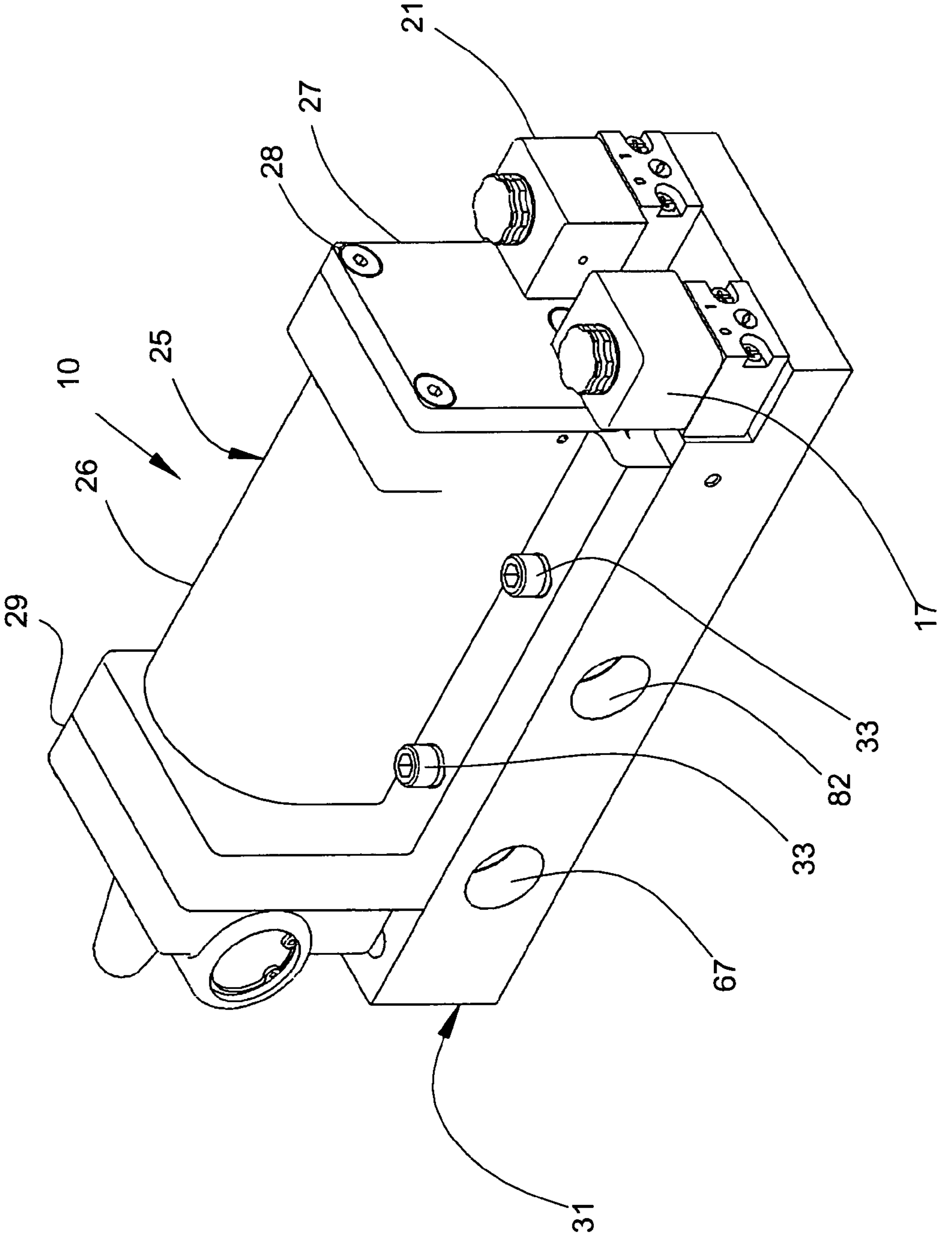
FIG. 4 is a perspective view of the housing of the control valve of FIG. 1.
Figure 5:
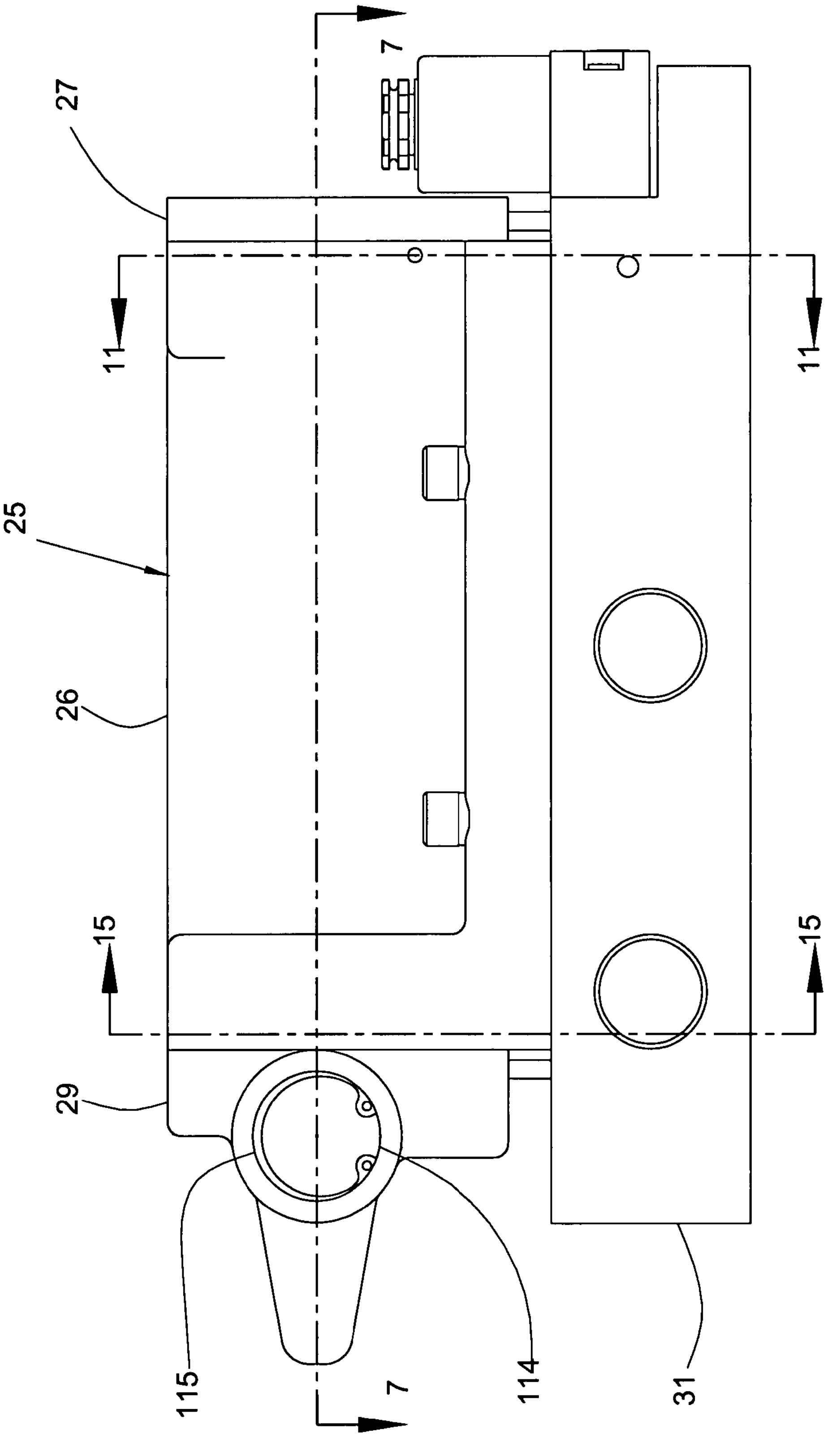
FIG. 5 is a side elevation view of the control valve of FIG. 1.
Figure 6:
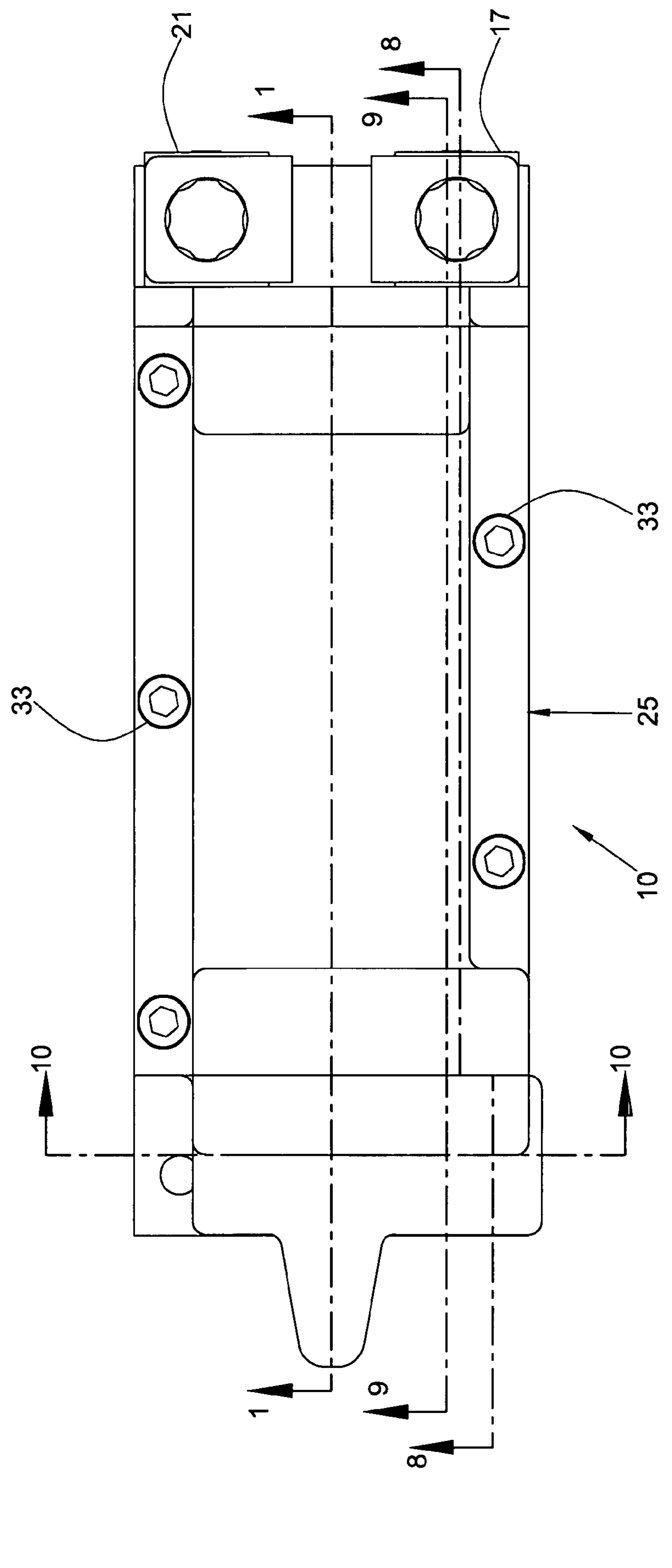
FIG. 6 is a top plan view of the control valve of FIG. 1.

The housing 25 includes a plate 31 fixed by screws 33 (see FIG. 4) to the body 26 in a sealing relation to form a sealed interior or space 32 (see FIG. 1) as in the aforesaid Allen et al patent. The plate 31 is mounted on the railroad car 12 (see FIG. 2) to support the housing 25 (see FIG. 1) on the railroad car 12 (see FIG. 2). The plate 31 has four mounting holes 33' (two shown in FIG. 16) to enable the plate 31 to be attached to the railroad car 12 (see FIG. 2).

The first solenoid 17 (see FIG. 4) is supported by the plate 31 as is the second solenoid 21. The housing 25 has a groove 34 (see FIG. 1) around its entire bottom to receive an O-ring 35 for sealing against the plate 31 to form the sealed interior or space 32.

A piston 36 is slidably mounted within a circular bore or chamber 37 in the body 26 having the sealed interior or space 32 of the housing 25. The piston 36 has a pin 38 fixed thereto adjacent its end surface 39 and extending from the piston 36 for a distance greater than the stroke of the piston 36 so that the pin 38 extends through a seal 40 in the end cap 29 when the piston 36 is in the door closing position of FIG. 1. The piston 36 has its other end surface 42 abutting the end cap 27 when the piston 36 is in its door closing position of FIG. 1.

The pin 38 extends into a slot 43 in a longitudinal, circular shaped interlock piston or element 44, which is slidably disposed in the end cap 29 and substantially perpendicular to the path of movement of the pin 38 and the piston 36. The slot 43 extends only partially through the interlock piston 44 as shown in FIG. 1.

Figure 7:
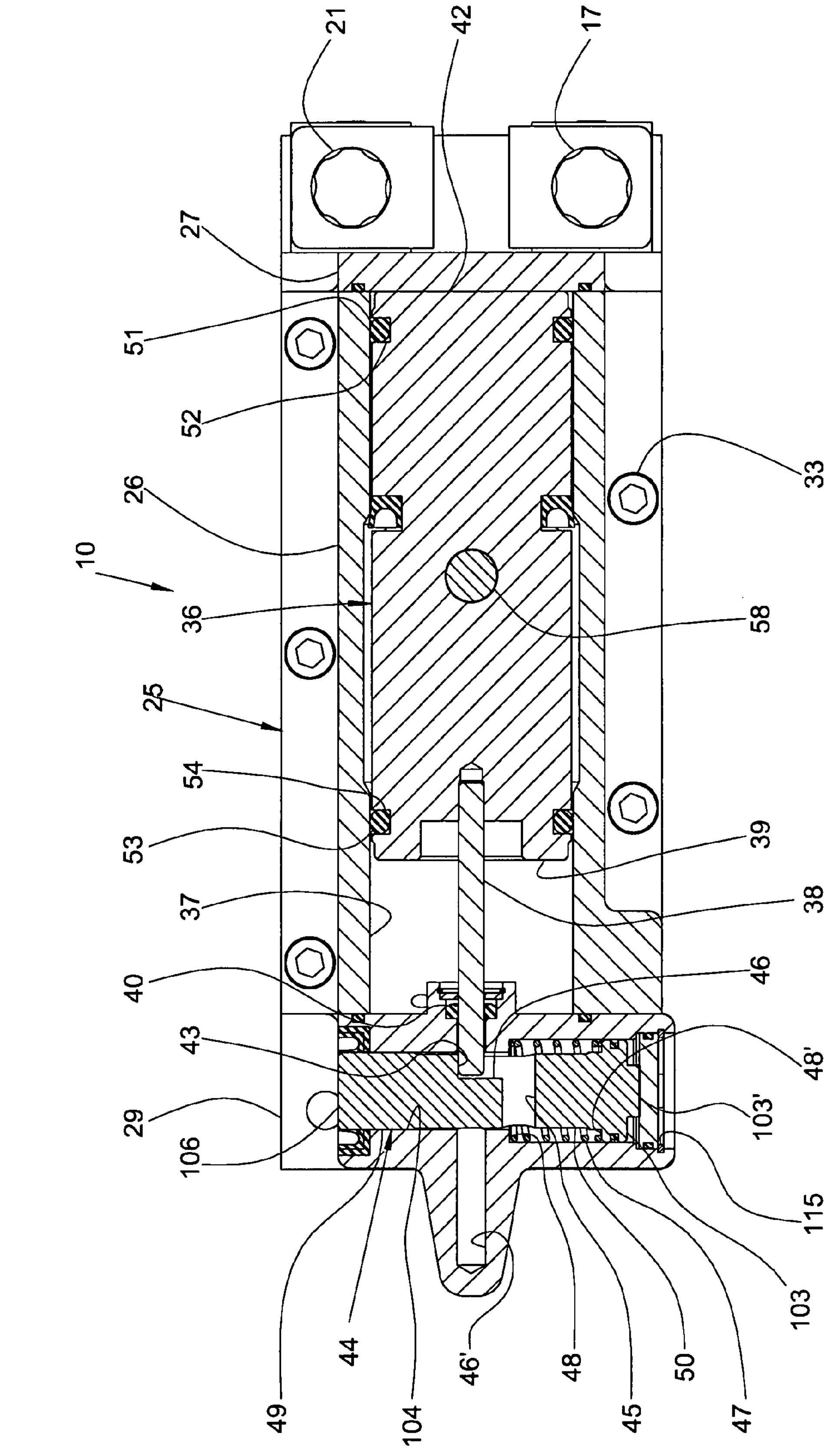
FIG. 7 is a sectional view, partly in plan, of the housing of the control valve of FIG. 1 and taken along line 7-7 of FIG. 5.

The interlock piston 44 has a curved (circular or oval shaped) passage 45 (see FIGS. 7 and 10) extending therethrough parallel to the axis of the pin 38 (see FIG. 7). When the interlock piston 44 is in its locked position of FIG. 7 in which the free end of the pin 38 engages a wall 46 defining part of the slot 43, this holds the piston 36 in its door closing position to prevent movement of the piston 36 to the left in FIG. 7 to its door opening position. When the interlock piston 44 is moved to the position of FIG. 13, the pin 38 (see FIG. 7) falls into the passage 45 through an opening (not shown)

therein from the slot 43 so that the pin 38 can pass through the passage 45 into a pin receiving portion 46' in the end cap 29.

A spring 47 biases the interlock piston 44 to its locked position of FIG. 7 and holds it there. One end of the spring 47 engages an annular surface 48 in the end cap 29, and its other end engages an annular surface 48' of the interlock piston 44.

The interlock piston 44 is considered to have two integral portions 49 and 50. The first portion 49 includes the wall 46 and the slot 43. The second portion 50 has the curved passage 45.

The piston 36 (see FIG. 1) has an O-ring 51 mounted in a groove 52 therein adjacent the end surface 42 of the piston 36 and engaging an inner surface of the body 26 of the housing 25 to form a seal therebetween. Similarly, the piston 36 also has an O-ring 53 mounted in a groove 54 therein adjacent the end surface 39 and engaging the inner surface of the body 26 of the housing 25 to form a seal therebetween. The piston 36 has a seal 55 between the O-rings 51 and 53 and closer to the O-ring 51. The O-rings 51 and 53 prevent the chamber therebetween from communicating with the sealed interior 32.

The plate 31 (see FIG. 1) has a flat, upper surface 56 along which a sliding shoe valve 57 is moved. The sliding shoe valve 57 has a circular shoe connecting pin 58 fixed thereto. The shoe connecting pin 58 is disposed within a circular passage 59 in the piston 36 so that the sliding shoe valve 57 moves horizontally with the piston 36.

A pair of guides 60 (one shown in FIG. 1) is disposed on opposite sides of the sliding shoe valve 57 and supported on the flat, upper surface 56 of the plate 31 of the housing 25. The two guides 60 insure that the sliding shoe valve 57 moves along its desired linear path as the piston 36 is advanced in either direction.

A spring 61 surrounds the portion of the shoe connecting pin 58 between the piston 36 and the sliding shoe valve 57. The spring 61 continuously urges a sealing portion 62 on the sliding shoe valve 57, which has a recess 63 therein surrounded by the sealing portion 62, into sealing engagement with the flat, upper surface 56 of the plate 31.

As shown in FIG. 1, the flat, upper surface 56 of the plate 31 has a pressure port 64 therein communicating with a source of fluid pressure. Fluid (air) pressure is supplied through the port 64 into the sealed interior or space 32 of the housing 25 between the O-rings 51 and 53.

The port 64 communicates through a passage 66 in the plate 31 with a port 67 (see FIG. 16) in a side surface 68, which is substantially perpendicular to the surface 56, of the plate 31 for connection to the source of pressure.

Figure 3:
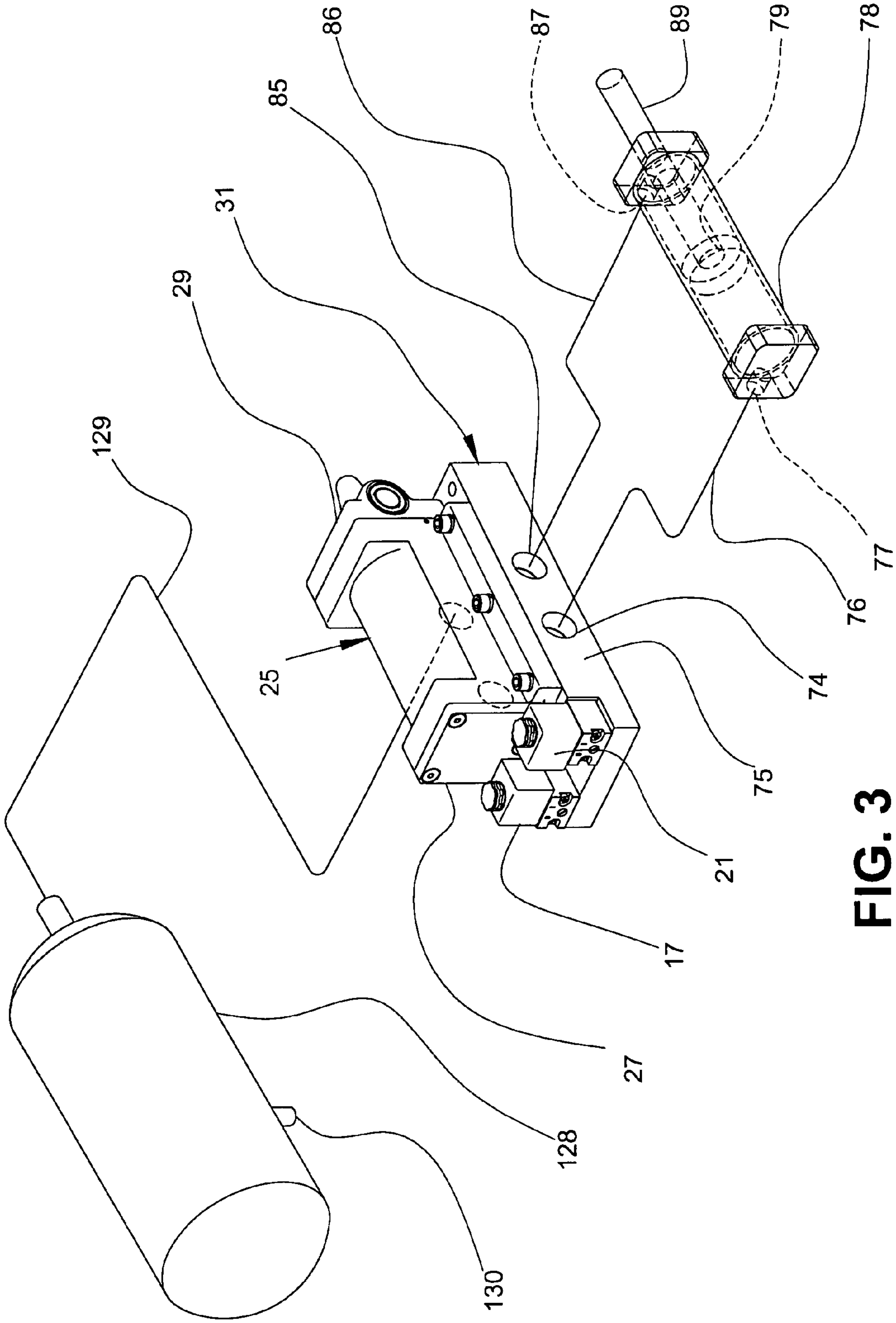
FIG. 3 is a schematic view of a source of air pressure as the fluid pressure for moving a piston in a housing of the control valve of FIG. 1 to cause supply of air pressure to an air cylinder for opening and closing the doors of a railroad car.
Figure 16:
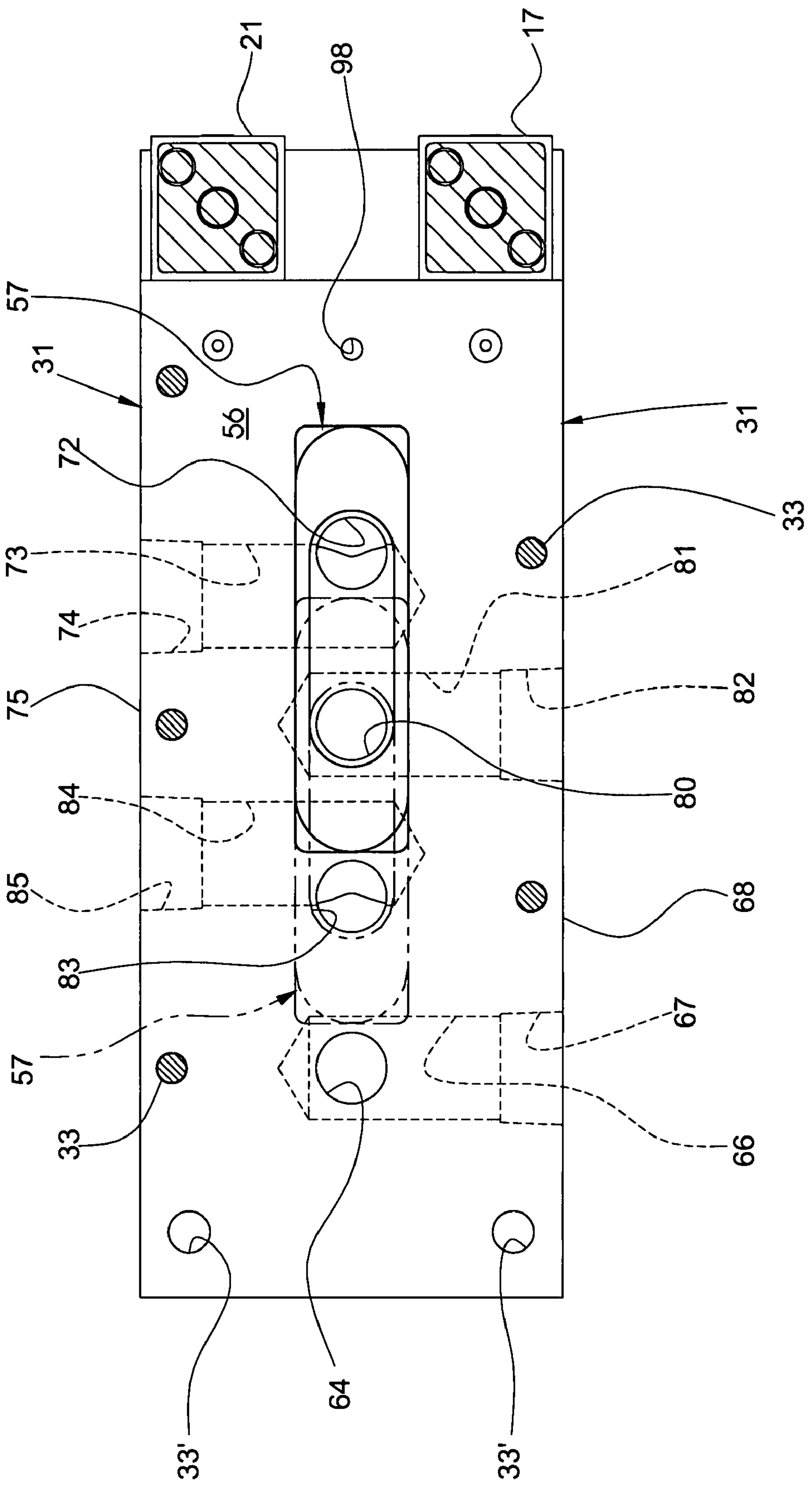
FIG. 16 is a top plan view of a plate on which a body of the housing of the control valve is mounted and showing a sliding shoe valve in a solid line position when the doors of the railroad cars are closed and in phantom line position when the doors of the railroad cars are open.

With the sliding shoe valve 57 in the phantom line position of FIG. 16, a port 72 in the flat, upper surface 56 of the plate 31 supplies air pressure from the sealed interior or space 32 (see FIG. 1) of the housing 25 through a passage 73 (see FIG. 16) in the plate 31 to an exit port 74 in a side surface 75, which is substantially perpendicular to the surface 56 and substantially parallel to the side surface 68, of the plate 31. The exit port 74 (see FIG. 3) communicates through a hose 76 and a port 77 in a cylinder 78 with the interior of the cylinder 78 having a piston 79 slidably mounted therein.

An exhaust port 80 (see FIG. 16) in the flat, upper surface 56 of the plate 31 communicates through a passage 81 with a port 82 in the side surface 68 of the plate 31 to the ambient. With the sliding shoe valve 57 (see FIG. 1) in the phantom line position of FIG. 16, the exhaust port 80 (see FIG. 16) communicates with a port 83 in the flat, upper surface 56 of the plate 31 through the recess 63 (see FIG. 1) in the sliding shoe valve 57. The port 83 (see FIG. 16) communicates through a passage 84 with a port 85 in the side surface 75 of the plate 31. This exhausts the air pressure from the interior of the cylinder 78 (see FIG. 3) on the opposite side of the piston 79 from the port 77 through a hose 86 from a port 87 in the cylinder 78 communicating therewith.

A connecting rod 89 connects the piston 79 to the doors 11 (see FIG. 2); for example, the connecting rod 89 (see FIG. 3) can be connected to the beam connecting the doors 11 (see FIG. 2) to each other. Thus, when the sliding shoe valve 57 (see FIG. 1) is in the solid line position of FIG. 16, air pressure is supplied from the port 85 through the hose 86 (see FIG. 3) to the port 87 to the interior of the cylinder 78 and exhausted from the interior of the cylinder 78 through the port 77 and the hose 76 to the port 74 in the side surface 75 of the plate 31, the doors 11 (see FIG. 2) are moved to their closed positions by movement of the piston 79 (see FIG. 3) to retract the connecting rod 89.

When the doors 11 (see FIG. 2) are to be opened, the coil 16 of the first solenoid 17 (see FIG. 1) is energized. The first solenoid 17 also could be activated mechanically, if desired.

Figure 8:
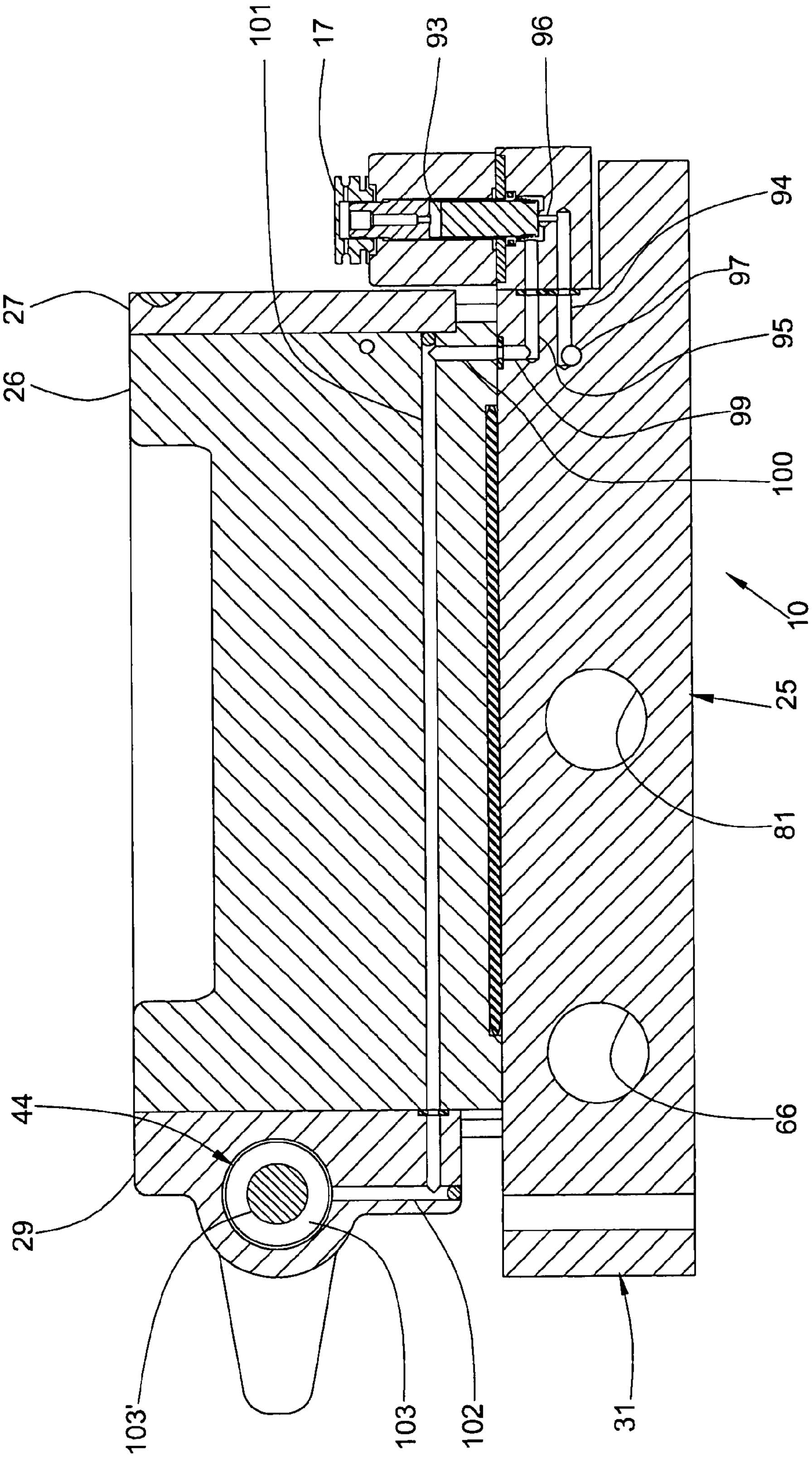
FIG. 8 is a sectional view, partly in elevation, of the housing of the control valve of FIG. 1 and taken along line 8-8 of FIG. 6.

When the first solenoid 17 (see FIG. 8) is activated, either electrically or mechanically, its plunger 93 is raised upwardly to enable a source pressure passage 94 in the plate 31 to communicate with a passage 95 through a passage 96. The passage 96 is blocked by the plunger 93 when the first solenoid 17 is inactivated.

To receive the fluid pressure, the source pressure passage 94 communicates with the sealed interior 32 (see FIG. 1) of the housing 25 through a passage 97 in the plate 31 extending from the passage 94 (see FIG. 8) to a passage 98 (see FIG. 1) in the plate 31 connecting the passage 97 with the sealed interior 32.

The passage 94 (see FIG. 8) also communicates through the passages 96 and 95 and passages 99, 100, 101, and 102 to apply fluid pressure from the sealed interior 32 (see FIG. 1) to an annular end surface 103 (see FIG. 8) of the interlock piston 44 surrounding a projecting portion 103' of the interlock piston 44. The fluid pressure exerts a sufficient force to overcome the force of the spring 47 (see FIG. 7) to move the interlock piston 44 in its bore 104 in the end cap 29 until the passage 45 in the interlock piston 44 is aligned with the pin 38. The pin 38 falls into the passage 45 from the slot 43 in the interlock piston 44 so that the pin 38 can enter the pin receiving portion 46' in the end cap 29.

This movement of the interlock piston 44 results in its end surface 106 (see FIG. 13) extending beyond a surface 107 of the end cap 29. This indicates that the interlock piston 44 is in its unlocked position so that the piston 36 (see FIG. 7) has been moved from its door closing position to its door opening position. This enables a user to know that the doors 11 (see FIG. 2) may be open if movement of the piston 36 (see FIG. 7) were to occur previously by the piston 36 being manually moved, for example.

Figure 9:
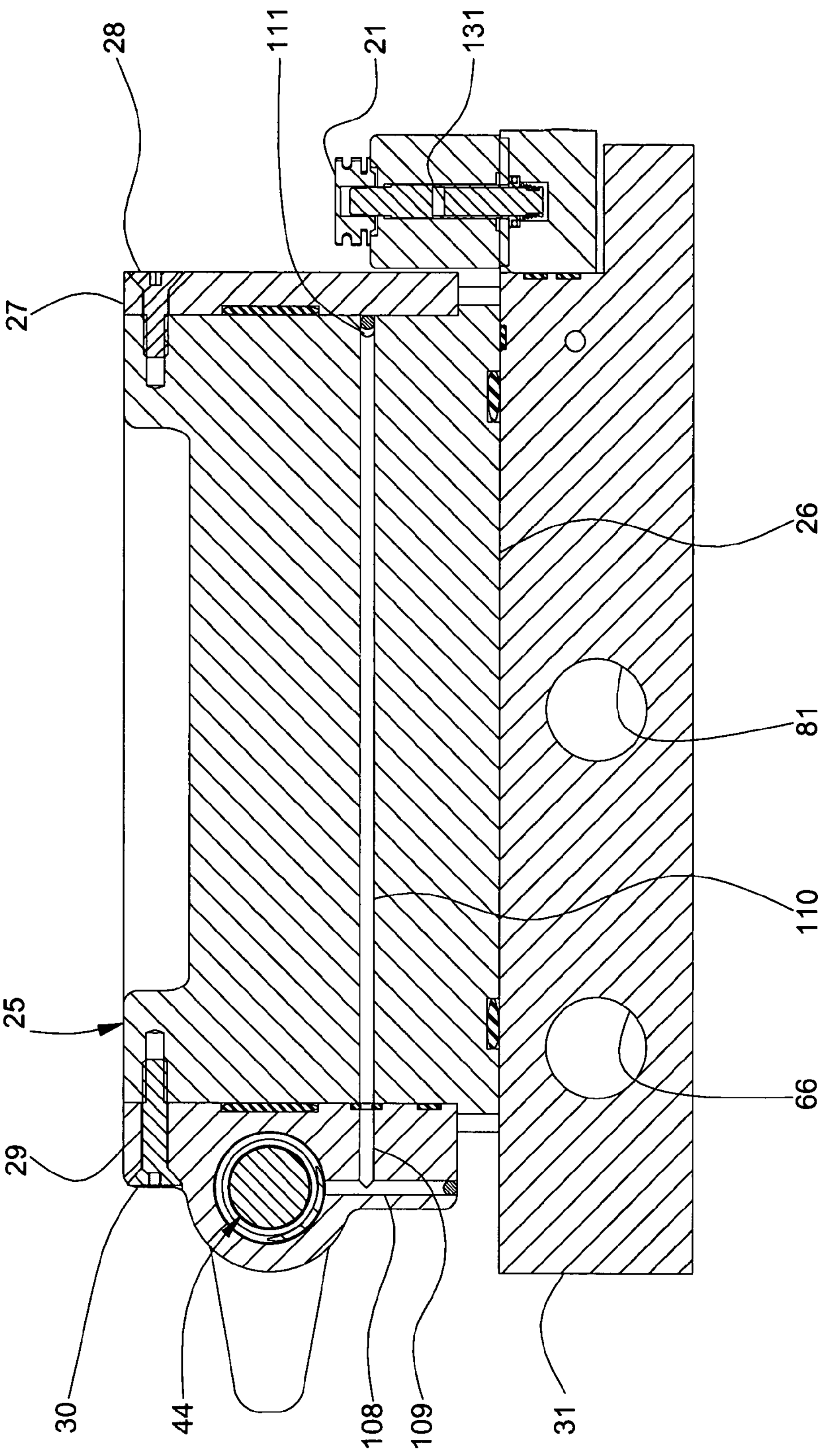
FIG. 9 is a sectional view, partly in elevation, of the housing of the control valve of FIG. 1 and taken along line 9-9 of FIG. 6.
Figure 10:
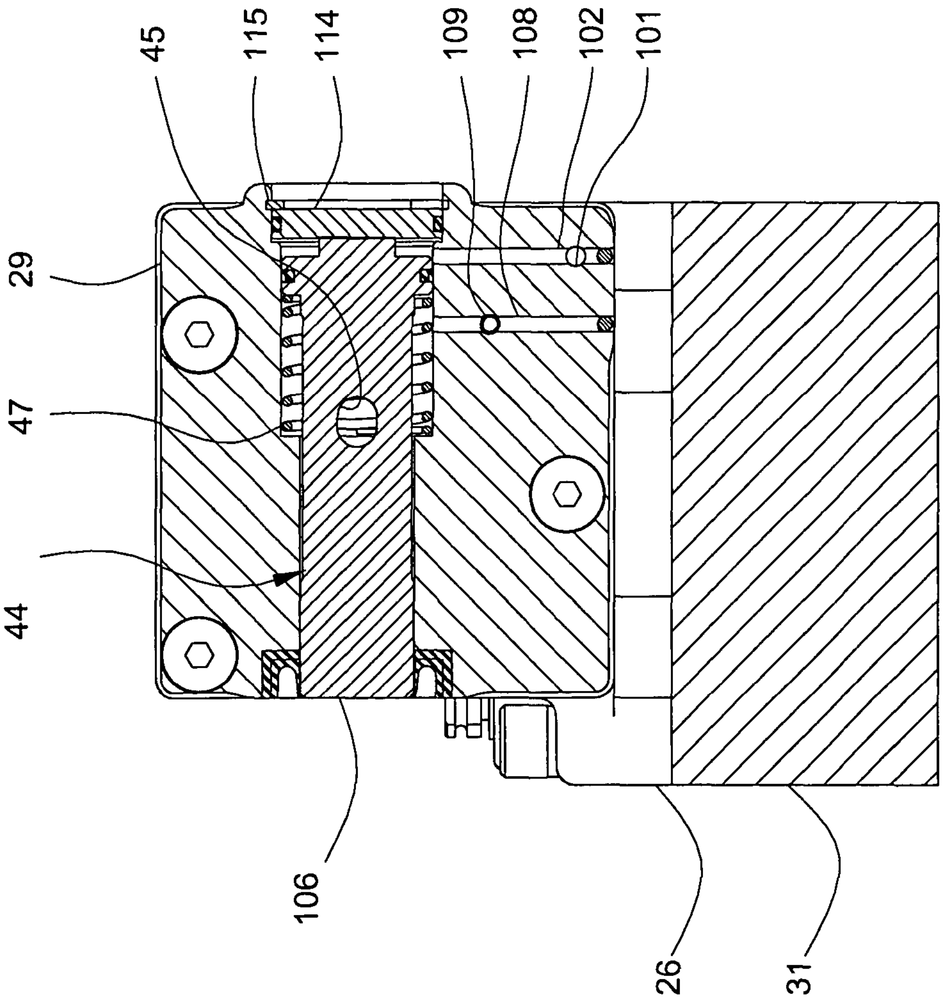
FIG. 10 is a sectional view of the housing of the control valve taken along line 10-10 of FIG. 6 and showing an interlock piston of the control valve in its locked position.
Figure 13:
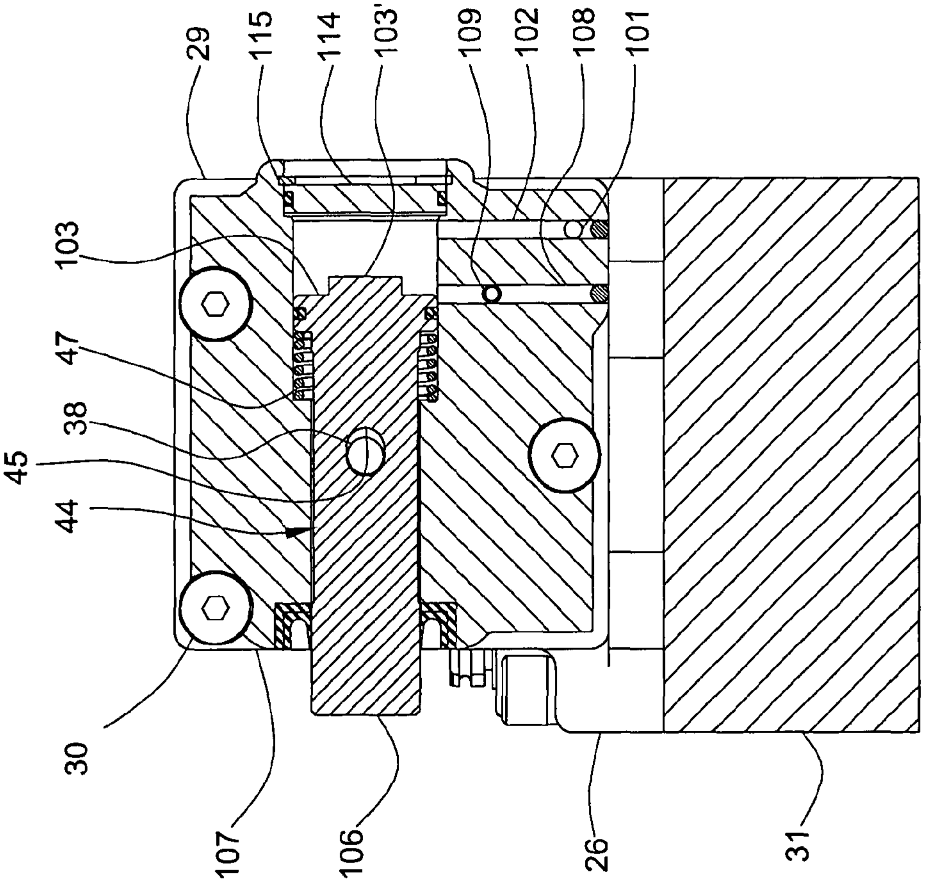
FIG. 13 is a sectional view, similar to FIG. 10, of the housing of the control valve and showing the interlock piston of the control valve in its unlocked position to enable movement of the movable piston in the housing to its door opening position.

As the interlock piston 44 moves from its locked position of FIG. 10 (door closed position of the piston 36 (see FIG. 1)) to its unlocked position of FIG. 13 (door open position of the piston 36 (see FIG. 1)), it uncovers a passage 108 (see FIG. 13) in the end cap 29 communicating through a passage 109 in the end cap 29 and passages 110 (see FIG. 9) and 111 in the body 26, and 112 (see FIG. 11) in the body 26 to act on the end surface 42 of the piston 36. When the interlock piston 44 (see FIG. 13) is its unlocked position of FIG. 13, the pressure of the fluid in the passage 108 (see FIG. 13) to move the piston 36 (see FIG. 1) to its door opening position is supplied from the passage 102 (see FIG. 13) since it is connected to the sealed interior 32 (see FIG. 1) through the passages 101 (see FIG. 8), 100, 99, 95, 96, 94, 97, and 98 (see FIG. 1).

A sealed end plate 114 (see FIG. 13) provides a sealed area between the passages 108 and 102. The sealed end plate 114 is retained in position by a retaining ring 115.

At this time, the second solenoid 21 (see FIG. 3) remains inactivated. Since the pin 38 (see FIG. 7) is disposed within the passage 45 in the interlock piston 44, it is not possible for the interlock piston 44 to retract. Thus, the annular end surface 106 of the interlock piston 44 remains in the position of FIG. 7. This indicates that the doors 11 (see FIG. 2) are closed.

Figure 11:
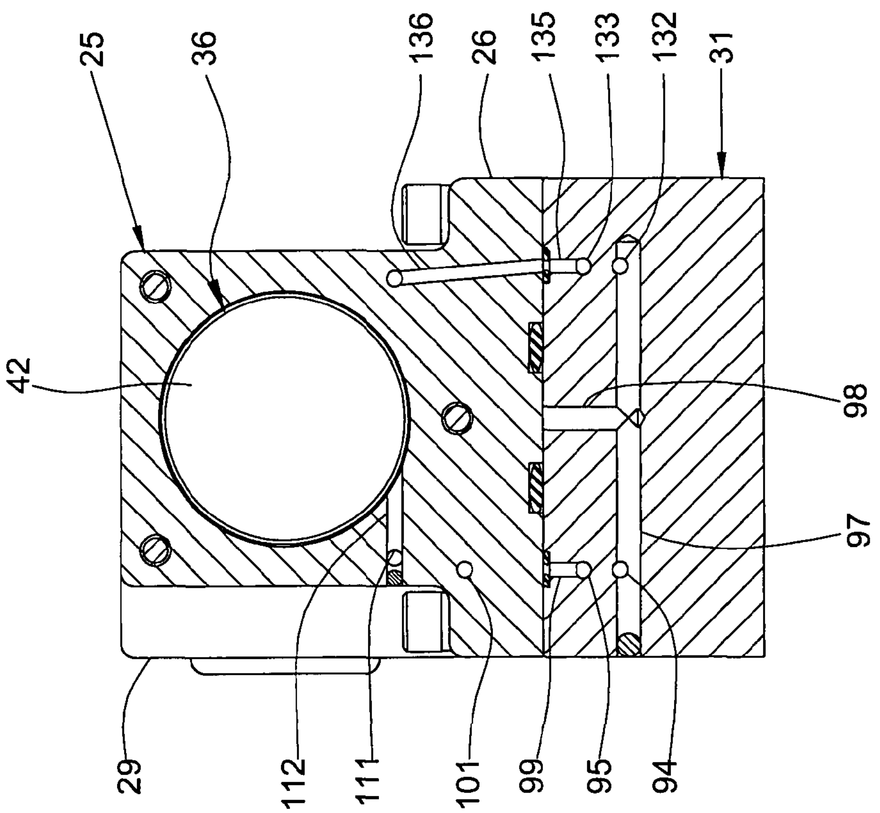
FIG. 11 is a sectional view of the housing of the control valve taken along line 11-11 of FIG. 5 and showing the relationship of some fluid pressure passages.

As previously mentioned, energization of the coil 16 of the first solenoid 17 (see FIG. 1) causes opening of the doors 11 (see FIG. 2) of the railroad car 12. This is accomplished through energization of the coil 16 causing fluid (air) pressure to be supplied to act on the O-ring 51 (see FIG. 1) in the groove 52 adjacent the first end surface 42 of the piston 36 to move the piston 36 to the left in FIG. 1. This also is shown in FIG. 11 by the fluid pressure in the passage 112 acting on the first end surface 42 of the piston 36.

Energization of the coil 20 (see FIG. 2) of the second solenoid 21 (see FIG. 7) causes the fluid (air) pressure to be applied against the O-ring 53 in the groove 54 adjacent the second end surface 39 of the piston 36. This returns the piston 36 to the position of FIG. 1 and causes the doors 11 (see FIG. 2) to be closed.

If the air pressure in the sealed interior or space 32 (see FIG. 1) of the housing 25 is at a predetermined pressure, then energization of the first solenoid 17 allows air pressure to act on the O-ring 51 adjacent the end surface 42 of the piston 36 to move the piston 36 to the left in FIG. 1. When this occurs, the sliding shoe valve 57 moves to the phantom line position in FIG. 16 so that the exit port 83 communicates with the exhaust port 80 and the exit port 72 communicates with the air pressure in the sealed interior or space 32 (see FIG. 1) within the housing 25. This results in the piston 79 (see FIG. 3) being moved to extend the connecting rod 89 to open the doors 11 (see FIG. 2). At this time, the port 87 (see FIG. 3) is connected through the recess 63 (see FIG. 1) in the sliding shoe valve 57 with the exhaust port 80 (see FIG. 16) to allow movement of the piston 79 (see FIG. 3) to extend the connecting rod 89.

Figure 14:
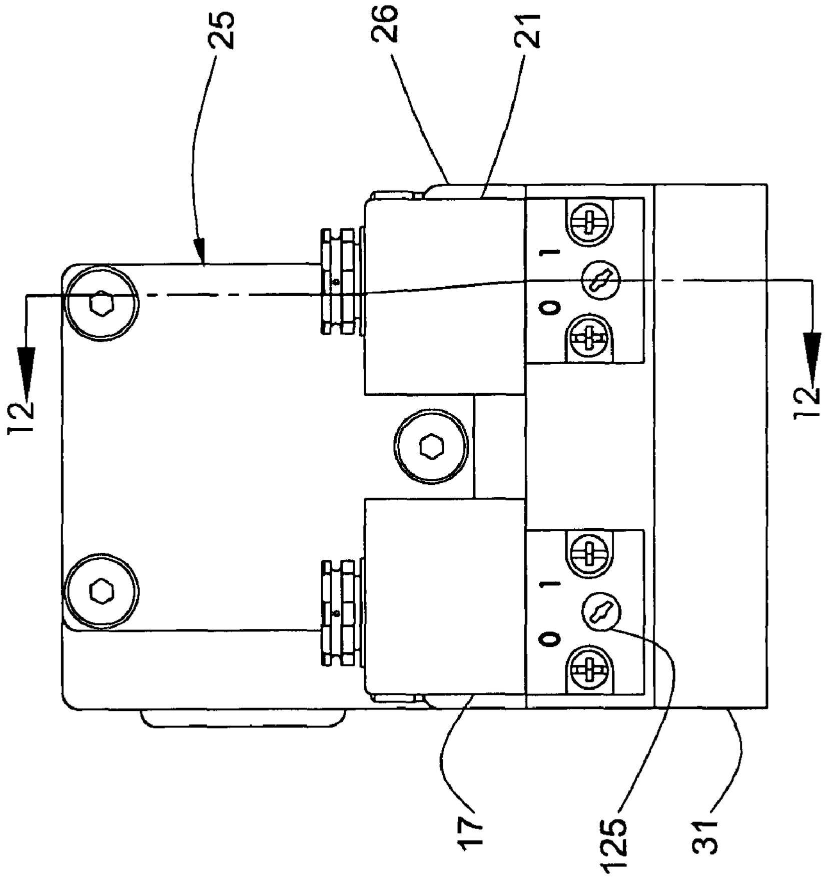
FIG. 14 is an end elevational view of the control valve of FIG. 5.
Figure 15:
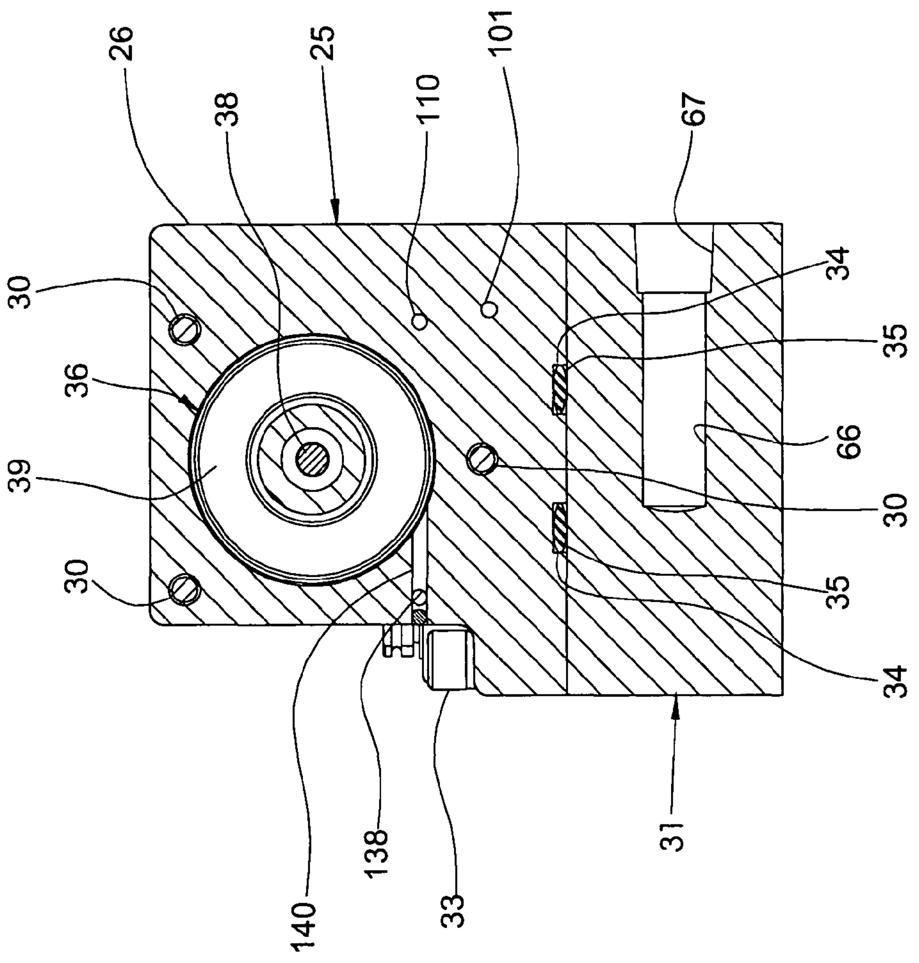
FIG. 15 is a sectional view of the housing of the control valve taken along line 15-15 of FIG. 5.

Inadvertent opening of the doors 11 (see FIG. 2) could occur if a manual activator 125 (see FIG. 14) moves the solenoid plunger 93 (see FIG. 8) of the first solenoid 17 against the force of a spring (not shown). This results in air in the air passage 94 acting on the annular end surface 103 of the interlock piston 44 without energization of the first solenoid 17.

The air pressure is supplied from a reservoir 128 (see FIG. 3) through a hose 129 to the sealed interior or space 32 (see FIG. 1) in the housing 25. It should be understood that the reservoir 128 (see FIG. 3) is supplied with the air pressure through a hose 130 from a compressor (not shown) on the locomotive of the train having a plurality of the railroad cars 12 (see FIG. 2).

The compressor is not activated until the train is near the location at which the coal is to be removed from each of the railroad cars 12. Because of the length of the trip from the coal mine to the power plant, for example, the air pressure within the reservoir 128 (see FIG. 3) drops since the compressor is not operating.

Therefore, it is necessary for the air pressure in the reservoir 128 to be replenished each time that the doors 11 (see FIG. 2) are to be opened. This is accomplished only in the last few miles before the train reaches the receiving area at which the coal is to be unloaded. Accordingly, the air pressure in the reservoir 128 (see FIG. 3) decreases between the time that the train leaves the power plant and returns to the power plant since the compressor at the locomotive, which is driving the train, is turned off after leaving the coal receiving area.

When the pick-up shoe 15 (see FIG. 2) ceases to engage the first rail 14, the first solenoid 17 (see FIG. 1) is deenergized. As a result, the plunger 93 (see FIG. 8) is returned to the position of FIG. 8 by the spring (not shown). Accordingly, the air pressure within the circular bore or chamber 37 (see FIG. 1) is removed as more particularly shown and described in the aforesaid Allen et al patent.

Figure 12:
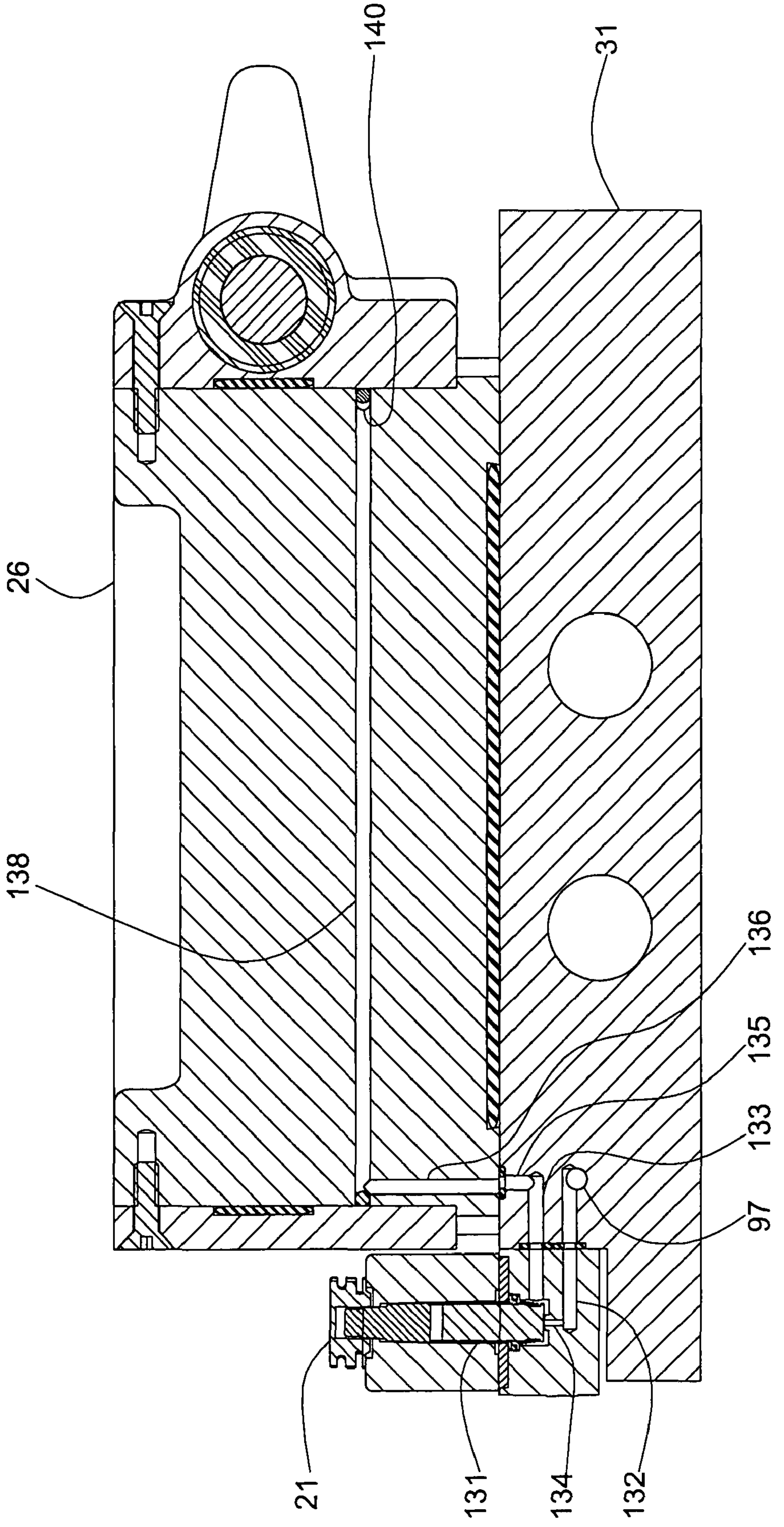
FIG. 12 is a sectional view of the housing of the control valve taken along line 12-12 of FIG. 14 and showing the relationship of some fluid pressure passages.

Therefore, when the pick-up shoe 15 (see FIG. 2) engages the second rail 19, the second solenoid 21 (see FIG. 12) has the coil 20 (see FIG. 2) energized to supply air pressure from the sealed interior or space 32 (see FIG. 1) of the housing 25.

When the second solenoid 21 (see FIG. 12) is activated, either electrically or mechanically, its plunger 131 is moved to enable a source pressure passage 132 to communicate with a passage 133 through a passage 134. The passage 132 communicates with the sealed interior 32 (see FIG. 1) of the housing 25 through the passages 98 and 97. The passage 132 (see FIG. 12) also communicates through the passages 134 and 133, and passages 135, 136, 138, and 140 to apply fluid pressure to the end surface 39 (see FIG. 1) of the piston 36.

This removes the pin 38 (see FIG. 7) from the passage 45. This results in the spring 47 acting on the interlock piston 44 to return the interlock piston 44 to its locked position of FIG. 7 from its unlocked position of FIG. 13. At the same time, the protruding end surface 106 of the interlock piston 44 is retracted to its position within the housing 25 as shown in FIG. 7. This indicates that the piston 36 is again in its door closed position and locked therein by the interlock piston 44.

Accordingly, when the second solenoid 21 has the coil 20 (see FIG. 2) energized so that air pressure is applied to the O-ring 53 (see FIG. 1) in the groove 54 adjacent the second end surface 39 of the piston 36, the piston 36 is returned to the position of FIG. 1.

Therefore, it should be understood that a similar arrangement is used for exhausting the air pressure acting on the O-ring 51 in the groove 52 adjacent the end surface 42 of the piston 36 after the pick-up shoe 15 (see FIG. 2) ceases to engage the second rail 19. This is because the coil 20 of the second solenoid 21 (see FIG. 1) is no longer energized whereby the air pressure in the chamber or bore 37 is exhausted.

At this time, the first solenoid 17 (see FIG. 7) is inactivated. Since the pin 38 is disposed within the passage 45, it is not possible for the interlock piston 44 to retract. Thus, the end surface 106 of the interlock piston 44 remains in the position of FIG. 10.

It should be understood that each of the activating elements could be air operated, for example, rather than being solenoids. Any other suitable activating element, which can be activated at predetermined positions and are spaced a predetermined distance from each other, may be utilized.

Figure 17:
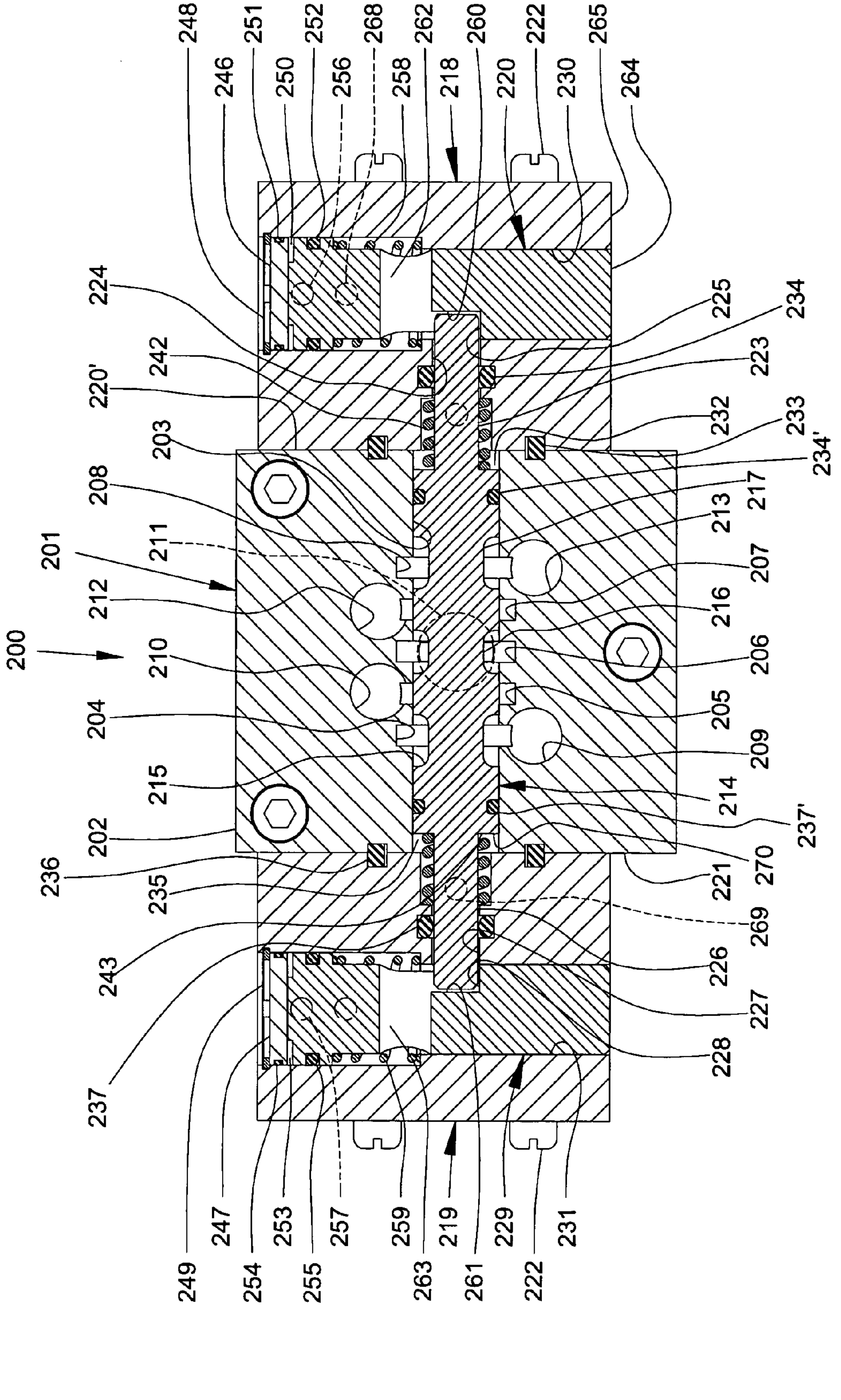
FIG. 17 is a sectional view, partly in elevation, of another embodiment of a control valve of the present invention having a spool valve to control movement of a movable element.

A control valve 200 (see FIG. 17) has a housing 201 including a body 202 having a cylindrical bore 203 extending therethrough. The body 202 has five annular grooves 204, 205, 206, 207, and 208 therein spaced equally along the axis of the bore 203 and communicating therewith.

The body 202 has each of five ports 209, 210, 211, 212, and 213 therein communicating with a corresponding one of the five annular grooves 204, 205, 206, 207, and 208, respectively.

A cylindrical spool 214 is slidably disposed in the bore 203. The spool 214 has three annular grooves 215, 216, and 217 equally spaced in the direction of the axis of the spool 214 along which the spool 214 moves in either direction.

The body 202 has end caps 218 and 219 attached to opposite sides 220' and 221, respectively, by screws 222. A first reduced end 223 of the spool 214 extends through a passage 224 in the end cap 218 into a slot 225 in a first interlock piston 220. The spool 214 has a second reduced end 226 extend through a passage 227 in the end cap 219 into a slot 228 in a second interlock piston 229. The interlock pistons 220 and 229 are disposed in bores 230 and 231, respectively, in the end caps 218 and 219, respectively. The bores 230 and 231 are substantially perpendicular to the axis of motion of the spool 214.

A fluid tight cavity 232 is formed at the junction of the side 220' of the body 202 and the end cap 218 by an end cap seal 233 and two spool seals (O-rings) 234 and 234'. Likewise, a fluid tight cavity 235 is formed at the junction of the side 221 of the body 202 and the end cap 219 by an end cap seal 236 and two spool seals (O-rings) 237 and 237'.

Spool centering springs 242 and 243 are disposed in the cavities 232 and 235, respectively. The springs 242 and 243 surround a portion of the reduced ends 223 and 226, respectively, of the spool 214.

The interlock pistons 220 and 229, respectively, are held in the bores 230 and 231, respectively, in the end caps 218 and 219, respectively, by piston caps 246 and 247, respectively. The piston caps 246 and 247 are retained in the bores 230 and 231, respectively, by retaining rings 248 and 249, respectively.

A fluid tight cavity 250 is formed by the first interlock piston 220 and the piston cap 246 by an O-ring 251 in the piston cap seal 246 at its edge and a piston seal (O-ring) 252. Similarly, a fluid tight cavity 253 is formed by the second interlock piston 229 and the piston cap 247 by an O-ring 254 in the piston cap 247 at its edge and a piston seal (O-ring) 255.

The fluid tight cavities 250 and 253 have passages 256 and 257, respectively, communicating therewith. A return spring 258 biases the first interlock piston 220 towards the piston cap 246. A return spring 259 biases the second interlock piston 229 towards the piston cap 247.

Each of the interlock pistons 220 and 229 is formed with one of the slots 225 and 228, respectively, having a wall 260 and 261, respectively, from which each of the reduced ends 223 and 226, respectively, of the spool 214 are slightly spaced, a small clearance. The interlock pistons 220 and 229 have passages 262 and 263, respectively, extending therethrough parallel to the axis of the spool 214. The passages 262 and 263 receive the reduced ends 223 and 226, respectively, of the spool 214 when the first interlock piston 220 and the second interlock piston 229, respectively, are moved against the force of the return springs 258 and 259, respectively.

Fluid pressure is supplied to the pressure port 211, but no fluid flows in the control valve 200 because the spool 214 is blocking each of the ports 209-213. By applying fluid pressure to one side of the control valve 200 from an external solenoid valve (not shown) through the passage 256 in the first interlock piston 220, the pressure acting on the first interlock piston 220 creates enough force to overcome the biasing force of the return spring 258. This results in the first interlock piston 220 moving until the reduced end 223 of the spool 214 enters the passage 262 in the first interlock piston 220. At this time, the first interlock piston 220 has its end surface 264 extend past an end surface 265 of the end cap 218. This indicates that the first interlock piston 220 of the control valve 200 is unlocked.

As the first interlock piston 220 moves to its unlocked position, the interlock piston seal 252 passes over a passage 268 in the bore 230 of the first interlock piston 220. Fluid pressure in the passage 268 is supplied through a connecting passage 269 in the end cap 219 to act on an annular surface 270 formed by the second reduced end 226 of the spool 214 to overcome the biasing force of the spool centering spring 242 surrounding the reduced end 223 of the spool 214. This results in the reduced end 223 of the spool 214 entering the passage 262 in the interlock piston 220 to enable the spool 214 to move to its shifted position.

In the shifted position of the spool 214, the groove 216 in the spool 214 connects the grooves 206 and 207 in the body 204. Likewise, the groove 215 in the spool 214 connects the grooves 204 and 205 in the body 204. This connects the pressure port 211 and the outlet port 212 while the outlet port 210 communicates with the exhaust port 209. The other exhaust port 213 is isolated.

When the pilot pressure is removed by the external solenoid valve (not shown), the force to maintain the spool 214 in its shifted position is removed. Then, the force of the spool centering spring 242 returns the spool 214 to its initial position. At the same time, the return spring 258 of the first interlock piston 220 attempts to force the first interlock piston 220 to its initial position. However, the first interlock piston 220 can be returned to its locked position only when the spool 214 has fully returned to its initial position to completely withdraw the first reduced end 223 on the spool 214 from the passage 262 in the first interlock piston 220. This is indicated by the end surface 264 of the first interlock piston 220 not extending past the end surface 265 of the end cap 218.

It should be understood that a similar operation exists with the second interlock piston 229 when it is desired to shift the spool 214 toward the second interlock piston 229. Thus, its operation will not be described.

Figure 18:
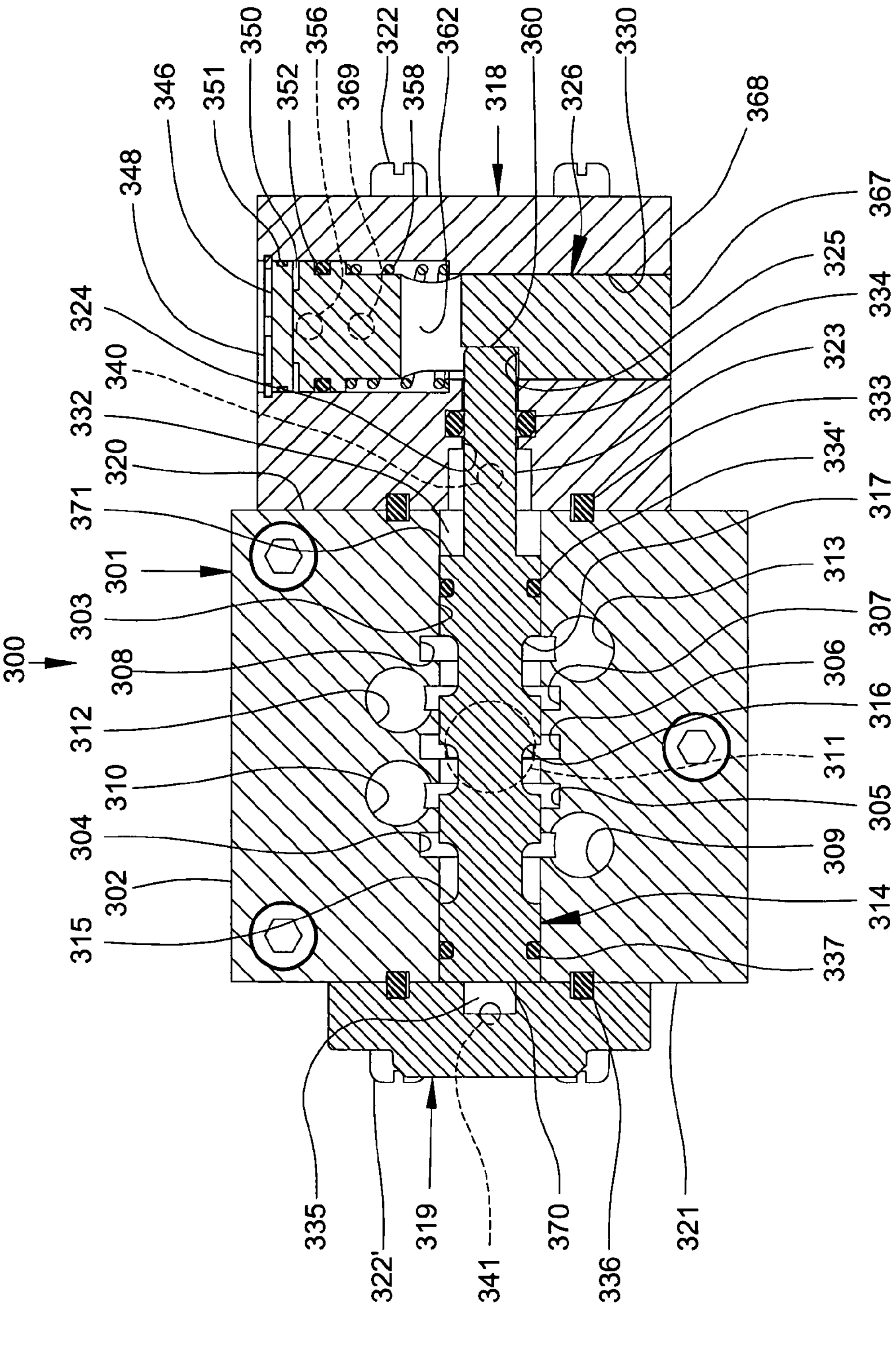
FIG. 18 is a sectional view, partly in elevation, of a further embodiment of a control valve of the present invention having a spool valve to control movement of a movable element.

A control valve 300 (see FIG. 18) has a housing 301 including a body 302 having a cylindrical bore 303 extending therethrough. The body 302 has five annular grooves 304, 305, 306, 307, and 308 therein spaced equally along the axis of the bore 303 and communicating therewith.

The body 302 has each of five ports 309, 310, 311, 312, and 313 therein communicating with a corresponding one of the five annular grooves 304, 305, 306, 307, and 308, respectively.

A cylindrical spool 314 is slidably disposed in the bore 303. The spool 314 has three annular grooves 315, 316, and 317 equally spaced in the direction of the axis of the spool 314 along which the spool 314 moves in either direction.

The body 302 has end caps 318 and 319 attached to opposite sides 320 and 321, respectively, by screws 322 and 322', respectively. A reduced end 323 of the spool 314 extends through a passage 324 in the end cap 318 into a slot 325 in an interlock piston 326. The interlock piston 326 is disposed in a bore 330 in the end cap 318. The bore 330 is substantially perpendicular to the axis of motion of the spool 314.

A fluid tight cavity 332 is formed at the junction of the side 320 of the body 302 and the end cap 318 by an end cap seal 333 and two spool seals (O-rings) 334 and 334'. Likewise, a fluid tight cavity 335 is formed at the junction of the side 321 of the body 302 and the end cap 319 by an end cap seal 336 and a spool seal (O-ring) 337.

The cavities 332 and 335 communicate with passages 340 and 341, respectively, in the end caps 318 and 319, respectively.

The interlock piston 326 is held in the bore 330 in the end cap 318 by a piston cap 346. The piston cap 346 is retained in the bore 330 by a retaining ring 348.

A fluid tight cavity 350 is formed by the interlock piston 326 and the piston cap 346 by an O-ring 351 in the piston cap 346 at its edge and a piston seal (O-ring) 352.

The fluid tight cavity 350 has a passage 356 communicating therewith. A return spring 358 biases the interlock piston 326 towards the piston cap 346.

The interlock piston 326 is formed with the slot 325 having a wall 360 from which the reduced end 323 of the spool 314 is slightly spaced, a small clearance. The interlock piston 326 has a passage 362 extending therethrough parallel to the axis of the spool 314. The passage 362 receives the reduced end 323 of the spool 314 when the interlock piston 326 is moved against the force of the return spring 358.

In the non-shifted position of the spool 314, the groove 316 in the spool 314 connects the grooves 305 and 306 to each other. Likewise, the groove 317 in the spool 314 connects the grooves 307 and 308 in the body 302 to each other. This connects the pressure port 311 and the outlet port 310 so that fluid pressure supplied to the pressure port 311 is transferred to the outlet port 310 for mechanical means such as extending or retracting a cylinder, for example. At the same time, the outlet port 312 communicates with the exhaust port 313. The exhaust port 309 is isolated.

By applying fluid pressure to one side of the control valve 300 from an external solenoid valve (not shown) through the passage 356 in the interlock piston 326, the pressure acting on the interlock piston 326 creates enough force to overcome the biasing force of the return spring 358. This results in the interlock piston 326 moving until the reduced end 323 of, the spool 314 enters the passage 362 in the interlock piston 326. At this time, the interlock piston 326 has its end surface 367 extend past an end surface 368 of the end cap 318. This indicates that the interlock piston 326 of the control valve 300 is unlocked.

As the interlock piston 326 moves to its unlocked position, the interlock piston seal 352 passes over a passage 369 in the bore 330 of the interlock piston 326. Fluid pressure in the passage 368 now acts through a communicating passage 341 in the body 302 on an end surface 370 of the spool 314 to move the spool 314. This results in the reduced end 323 of the spool 314 entering the passage 362 in the interlock piston 326 to enable the spool 314 to move to its shifted position.

In the shifted position of the spool 314, the groove 316 in the spool 314 connects the grooves 306 and 307 in the body 302. Likewise, the groove 315 in the spool 314 connects the grooves 304 and 305 in the body 302. This connects the pressure port 311 and the outlet port 312 while the outlet port 310 communicates with the exhaust port 309. The other exhaust port 313 is isolated.

When pilot pressure is removed by the external solenoid valve (not shown), the spool 314 will remain in this position by the friction of O-rings 334' and 337 in the bore 303 of the body 302. Without pressure to overcome the biasing force of the return spring 358, the biasing force of the return spring 358 is applied to the interlock piston 326 to return it to its initial position. However, because the reduced end 323 of the spool 314 is shifted into the passage 362 in the interlock piston 326, the interlock piston 326 is locked against movement.

By applying pressure to the other side of the control valve 300 from a second solenoid valve (not shown) through the passage 340 in the end cap 318, the pressure acting on an annular surface 371 of the spool 304 creates enough force to move the spool 314 to its initial position. As the spool 314 returns to its initial position, the reduced end 323 of the spool 314 is removed from the passage 362 to allow the interlock piston 326 to return to its initial locked position by the force of the return spring 358.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A control valve comprising:

a housing having a movable element therein movable between first and second positions along a linear axis in response to fluid pressure acting on at least one of opposite ends of said movable element;

an interlock element supported by said housing and movable substantially perpendicular to the axis along which said movable element moves;

one end of said movable element having an extension extending therefrom for a greater distance than the travel distance of said movable element in the direction in which the extension extends;

said interlock element being movable between a first position to which it is biased by a biasing force and a second position to which it is moved when the biasing force on said interlock element is removed;

said interlock element retaining said movable element in its first position when said interlock element is in its first position to prevent movement of said movable element from its first position;

and said interlock element ceasing to prevent movement of said movable element when said interlock element is moved to its second position so that said movable element can be moved to its second position.

2. The control valve according to claim 1 comprising:

a resilient member acting on said interlock element to bias said interlock element to its first position;

and fluid pressure acting on said interlock element to overcome the biasing force to move said interlock element to its second position.

3. The control valve according to claim 2 comprising a passage extending through said interlock element in the same direction as the axis along which said movable element moves to receive said extension of said movable element when said interlock element is in its second position.

4. The control valve according to claim 3 comprising said interlock element having an indicator to indicate whether said interlock element is in at least one of its first position and its second position.

5. The control valve according to claim 4 comprising said indicator of said interlock element being a portion of said interlock element with one of its position indicators being a portion of said interlock element extending exterior of said housing and the other of its position indicators being a portion of said interlock element not extending from said housing.

6. The control valve according to claim 5 comprising a passage extending through said interlock element in the same direction as the axis along which said movable element moves to receive said extension of said movable element when said interlock element is in its second position.

7. The control valve according to claim 6 in which said interlock element is an interlock piston.

8. The control valve according to claim 1 comprising a passage extending through said interlock element in the same direction as the axis along which said movable element moves to receive said extension of said movable element when said interlock element is in its second position.

9. The control valve according to claim 8 comprising said indicator of said interlock element being a portion of said interlock element with one of its position indicators being a portion of said interlock element extending exterior of said housing and the other of its position indicators being said portion of said interlock portion not extending from said housing.

10. The control valve according to claim 1 in which said interlock element is an interlock piston.

11. The control valve according to claim 1 comprising a passage extending through said interlock element in the same direction as the axis along which said movable element moves to receive said extension of said movable element when said interlock element is in its second position.

12. The control valve according to claim 1 comprising said movable element in said housing being movable between first and second positions along a linear axis in response to fluid pressure acting on either of opposite ends of said movable element.

* * * * *